US012462678B2

(12) United States Patent
Beaurepaire et al.

(10) Patent No.: US 12,462,678 B2
(45) Date of Patent: Nov. 4, 2025

(54) METHOD AND APPARATUS FOR DETERMINING AN INTERSECTION CONDITION

(71) Applicant: HERE Global B.V., Eindhoven (NL)

(72) Inventors: Jerome Beaurepaire, Courbevoie (FR); Nicolas Neubauer, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 184 days.

(21) Appl. No.: 18/086,318

(22) Filed: Dec. 21, 2022

(65) Prior Publication Data

US 2024/0212486 A1 Jun. 27, 2024

(51) Int. Cl.
*G08G 1/01* (2006.01)
*G06N 20/00* (2019.01)

(52) U.S. Cl.
CPC ........... *G08G 1/0133* (2013.01); *G06N 20/00* (2019.01); *G08G 1/0108* (2013.01); *G08G 1/0129* (2013.01)

(58) Field of Classification Search
CPC .. G08G 1/0133; G08G 1/0108; G08G 1/0129; G08G 1/0112; G06N 20/00
See application file for complete search history.

(56) References Cited

U.S. PATENT DOCUMENTS

| 9,030,476 B2* | 5/2015 | Peterson | G06T 1/60 |
| | | | 345/419 |
| 9,646,391 B2* | 5/2017 | Ettelaie | G06F 18/295 |
| 2012/0231742 A1* | 9/2012 | Barberis | H04W 16/10 |
| | | | 455/63.1 |
| 2014/0278052 A1* | 9/2014 | Slavin | G01C 21/3492 |
| | | | 701/400 |

(Continued)

FOREIGN PATENT DOCUMENTS

| CN | 106297297 B | 11/2018 |
| DE | 102016004028 A1 | 2/2017 |

(Continued)

OTHER PUBLICATIONS

Ugwu et al., "An application of fuzzy logic model in solving road traffic congestion", International Journal of Engineering Research & Technology (IJERT), vol. 03, Issue 02, Feb. 2014, pp. 2960-2969.

(Continued)

*Primary Examiner* — Donald J Wallace
*Assistant Examiner* — Jalal C Coduroglu
(74) *Attorney, Agent, or Firm* — DITTHAVONG, STEINER, & MLOTKOWSKI

(57) ABSTRACT

A method, apparatus, and non-transitory computer-readable storage medium for determining an intersection condition are provided. An example embodiment may obtain entity count data of an area comprising an intersection, obtain map feature data of the area comprising the intersection, obtain temporal context data of the area comprising the intersec- (Continued)

tion, and generate an intersection deadlock score based on the entity count data, the map feature data, the temporal context data, or a combination thereof. The generated intersection deadlock score may further be used to provide a prediction of a deadlock condition based on the intersection deadlock score to a traffic application and/or a navigation application.

20 Claims, 11 Drawing Sheets

(56) References Cited

U.S. PATENT DOCUMENTS

| | | |
|---|---|---|
| 2019/0301890 A1 | 10/2019 | Stenneth et al. |
| 2020/0234582 A1* | 7/2020 | Mintz ............... G08G 1/096811 |
| 2020/0259936 A1* | 8/2020 | Lusted ................. H04L 49/351 |
| 2020/0294401 A1* | 9/2020 | Kerecsen ............... G08G 1/205 |
| 2022/0086122 A1* | 3/2022 | Therani ................... H04W 4/02 |
| 2022/0332350 A1* | 10/2022 | Jha .................... B60W 60/0017 |
| 2022/0340177 A1* | 10/2022 | Khayatian ............. B60W 60/00 |
| 2023/0068181 A1* | 3/2023 | Qi ......................... G08G 1/052 |

FOREIGN PATENT DOCUMENTS

| | | | |
|---|---|---|---|
| EP | 3934288 A1 | 1/2022 | |
| EP | 4343478 A1 * | 3/2024 | .......... G05D 1/0297 |
| WO | 2021092039 A1 | 5/2021 | |

OTHER PUBLICATIONS

Frojdendahl et al., "Machine learning for traffic control of unmanned mining machines", retrieved on Dec. 21, 2022 from https://www.diva-portal.org/smash/get/diva2:1355105/FULLTEXT01.pdf, 54 pages.

* cited by examiner

METHOD AND APPARATUS FOR DETERMINING AN INTERSECTION CONDITION

TECHNOLOGICAL FIELD

Example embodiments relate to a method, apparatus, non-transitory computer-readable storage medium, system, and computer program product for determining an intersection condition, and more particularly, determining or predicting an intersection deadlock condition based on entity observation data of an area associated with the intersection.

BACKGROUND

Historically humans have observed road network situations and conveyed the observations through different channels, ranging from roadside personnel counting traffic to drivers reporting traffic situations by calling into radio stations. Such efforts, even to this day, include overhead views from, e.g., TV station helicopters reporting traffic conditions on different stretches of the road network. Such methods, while adequate for certain situations, are at best snapshots of a limited area and are prone to error.

In contrast, modern road network observations are performed using a variety of data sources. Among such sources are modern vehicles which include a plurality of different types of sensors for collecting a wide variety of information. These sensors include location sensors, such as global navigation satellite system (GNSS) sensors, configured to determine, among other variables, the location, speed and heading of the vehicle. Based upon the location and speed of the vehicle, a variety of navigational, mapping, traffic information, and other services may be provided for manually driven vehicles as well for navigation and control of autonomous or semi-autonomous vehicles. Other examples of sensors include cameras or other imaging sensors that capture images of the environment including objects in the vicinity of the vehicle. The images that are captured may be utilized to determine a traffic situation on the road network, be it vehicle traffic or pedestrian traffic. Another example of data sources may be mobile devices such as mobile phones, cellular phones, smartphones, etc. Such mobile devices may also include location sensors, allowing for determining a location, heading and speed of the mobile device. In addition, further sensors, such as accelerometers, magnetometers, etc. may allow for determining if the mobile device is being carried by a pedestrian or in a vehicle. Similar to vehicles, mobile devices may also include camera or other imaging sensors that capture images of the environment including objects in the vicinity of the mobile device. The images that are captured may be utilized to determine a traffic situation on the road network, be it vehicle or pedestrian traffic. A further example of data sources are traffic cameras, which are usually affixed to roadside infrastructure such as traffic lights, poles, buildings, etc. Instead of relying on an impression of how many vehicles and/or pedestrians are on the road, as the TV station helicopter would usually do, modern traffic camera imagery can be processed using computer vision techniques providing reliable counts of vehicles and/or pedestrians in their field of view for any given period of time.

The different data sources collect a wide variety of data that may be utilized for various purposes. However, as the data source devices are not always available on every area of the road network, there are currently limitations to the applicability of this data, such that the data sources do not provide all the relevant information that would be useful in various applications. One example is in the generation of traffic information for use in traffic simulation, navigation, route guidance or automated vehicle controls in certain scenarios.

BRIEF SUMMARY

A method, apparatus, non-transitory computer readable storage medium, and computer program product are provided in accordance with an example embodiment to determine and predict intersection deadlock conditions. A system arranged in accordance with an example embodiment may also be provided. In this regard, the method, apparatus, non-transitory computer readable storage medium, system, and computer program product of an example embodiment may utilize entity observation data or entity count data from different data sources, static map feature data, and dynamic temporal context data of an area associated with an area comprising an intersection to generate an intersection deadlock score for the intersection. As used in this application, the term entity refers to vehicles, pedestrians (e.g. people moving on or along the road network), people (e.g. bystanders, event attendees), livestock, (semi-)autonomous robots, or similar road participants, which are capable of being mobile and utilize or are adjacent to the road network. Based on the intersection deadlock score, a prediction of an intersection deadlock condition can be provided to a navigation application or a traffic application. Such navigation applications may e.g. cause a user interface alert to alter the current path or route, cause a routing engine to penalize a set of road elements to direct a routing algorithm to provide an alternate route, cause a vehicle to initiate a mode change between an autonomous driving mode and a manual driving mode. Similarly, a traffic application may, for example in road/city planning scenarios, simulate traffic flow behavior and alert of simulation configuration parameters that cause intersection deadlocks, or in traffic monitoring center scenarios, transmit intersection deadlock events to traffic clients, and the like. As an example, the prediction may be useful in providing additional information, including routing information, traffic incident alerts, etc. By way of another example, the prediction may also be useful for federal, state, local or other governmental or regulatory officials that design and maintain the roads, intersections and adjacent sidewalks.

Embodiments provided herein include an apparatus having at least one processor and at least one memory including computer program code with the at least one memory and computer program code being configured to, with the processor, cause the apparatus to: receive, from at least one sensor data source, entity observation data of an area comprising an intersection of a road network; obtain, from a map database, map feature data of the area comprising the intersection; generate, as a function of a machine learning model, an intersection deadlock score based on the entity observation data and the map feature data; and provide a prediction of a deadlock condition based on the intersection deadlock score to a navigation application.

According to certain embodiments, the entity observation data further includes an entity count within the area for a time window. According to some embodiments, the entity count may be further classified based on at least one of vehicular probe data, pedestrian probe data, image-based vehicle count data, image-based pedestrian count data, or a combination thereof.

According to certain embodiments, the intersection deadlock score is further based on temporal context data of the area comprising the intersection. In some embodiments, the temporal context data further comprises intersection deadlock scores of neighboring intersections of the intersection.

According to certain embodiments, the map feature data includes road feature data of a plurality of road segments connected to the intersection and includes one of a lane count, functional class, traffic light information, speed limit information, adjacent Point-of-Interest (POI) information, or a combination thereof for each respective road segment.

According to certain embodiments, the machine learning model is based on at least one generalized intersection deadlock vector.

Embodiments provided herein include a method including receiving, from at least one sensor data source, entity observation data of an area comprising an intersection of a road network; obtaining temporal context data of the area comprising the intersection; generating an intersection state vector based on the entity observation data and the temporal context data; generating, as a function of a machine learning model, an intersection deadlock score based on the intersection state vector; and providing a prediction of a deadlock condition based on the intersection deadlock score to a navigation application. The method of embodiments disclosed herein may also be a computer implemented method.

According to certain embodiments, the method includes obtaining map feature data of the area comprising the intersection. The map feature data of the area includes road feature data of a plurality of road segments connected to the intersection; and the map feature data comprises one of a lane count, functional class, traffic light information, speed limit information, adjacent POI information, or a combination thereof for each respective road segment.

Embodiments provided herein include a non-transitory computer-readable storage medium having computer-executable program code instructions stored therein, the computer-executable program code instructions including program code instructions to: obtain, via a program interface, entity count data of an area comprising an intersection of a road network; obtain, from a map database, map feature data of the area comprising the intersection; generate, as a function of a machine learning model, an intersection deadlock score based on the entity count data and the map feature data; and provide a prediction of a deadlock condition based on the intersection deadlock score to a traffic application.

In certain embodiments, the entity count data may be further classified based on vehicle type or pedestrian entity. In certain embodiments, the program code further includes instructions to obtain temporal context data of the area comprising the intersection. In some embodiments, the temporal context data includes intersection deadlock scores of neighboring intersections of the intersection.

Also, a computer program product may be provided. For example, a computer program product comprising instructions which, when the program is executed by a computer, cause the computer to carry out the steps described herein.

According to another embodiment, an apparatus comprises means for using a sensor to capture sensor data of an environment including an object over a period of time. The apparatus also comprises means for receiving, from at least one sensor data source, entity observation data of an area comprising an intersection. The apparatus further comprises means for obtaining, from a map database, map feature data of the area comprising the intersection. In addition, the apparatus further comprises means for generating, as a function of a machine learning model, an intersection deadlock score based on the entity observation data and the map feature data. The apparatus further comprises means for providing a prediction of a deadlock condition based on the intersection deadlock score to a navigation application.

For various example embodiments, the following is applicable: An apparatus or a system comprising means for performing a method of the claims.

For various example embodiments, the following is applicable: A computer program product comprising instructions for causing means of an apparatus or a system to perform a method of the claims.

BRIEF DESCRIPTION OF THE DRAWINGS

Figure 1:
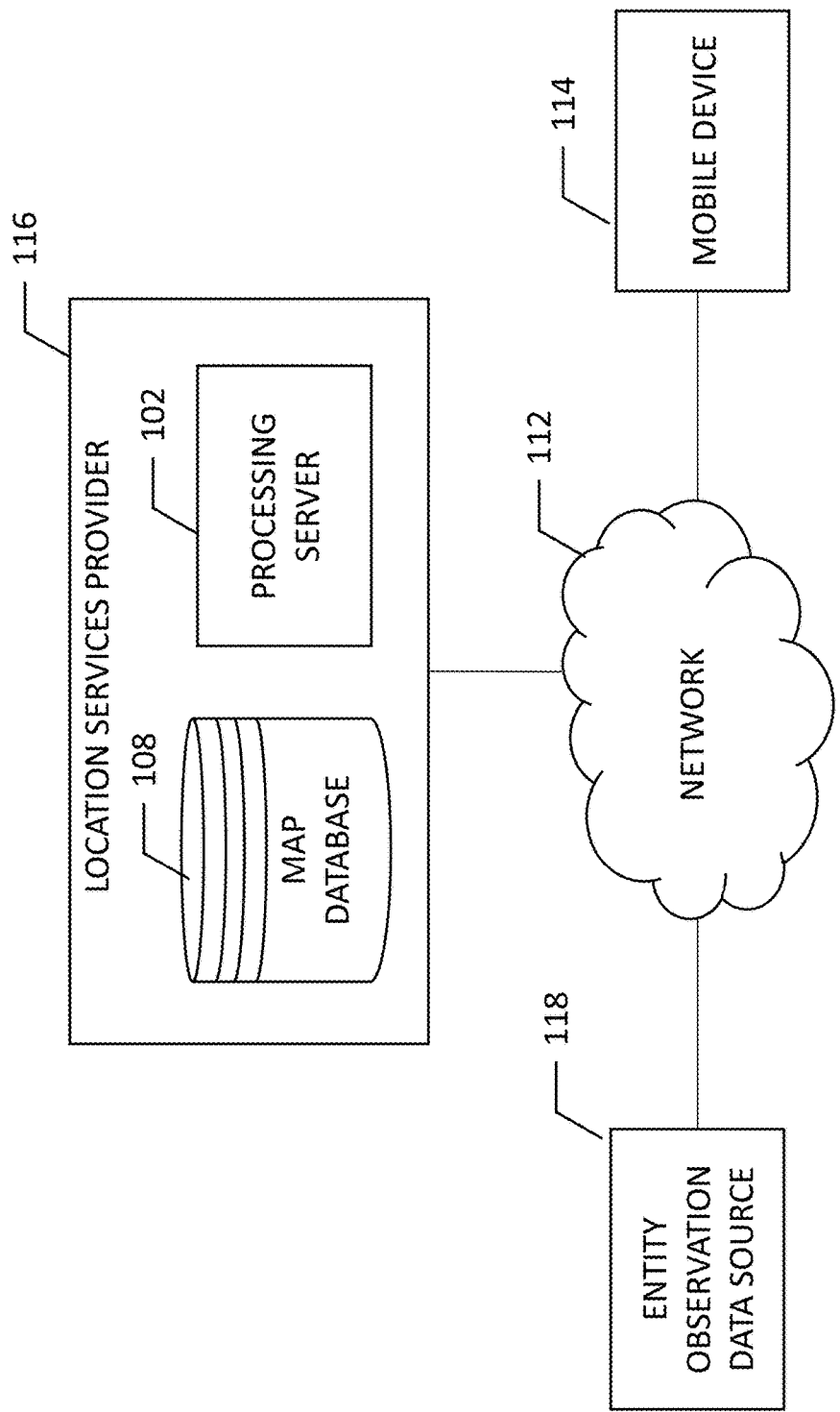

Having thus described certain embodiments of the invention in general terms, reference will now be made to the accompanying drawings, which are not necessarily drawn to scale, and wherein:

FIG. 1 is a block diagram of a system for providing intersection condition predictions according to an example embodiment of the present disclosure.

Figure 2:
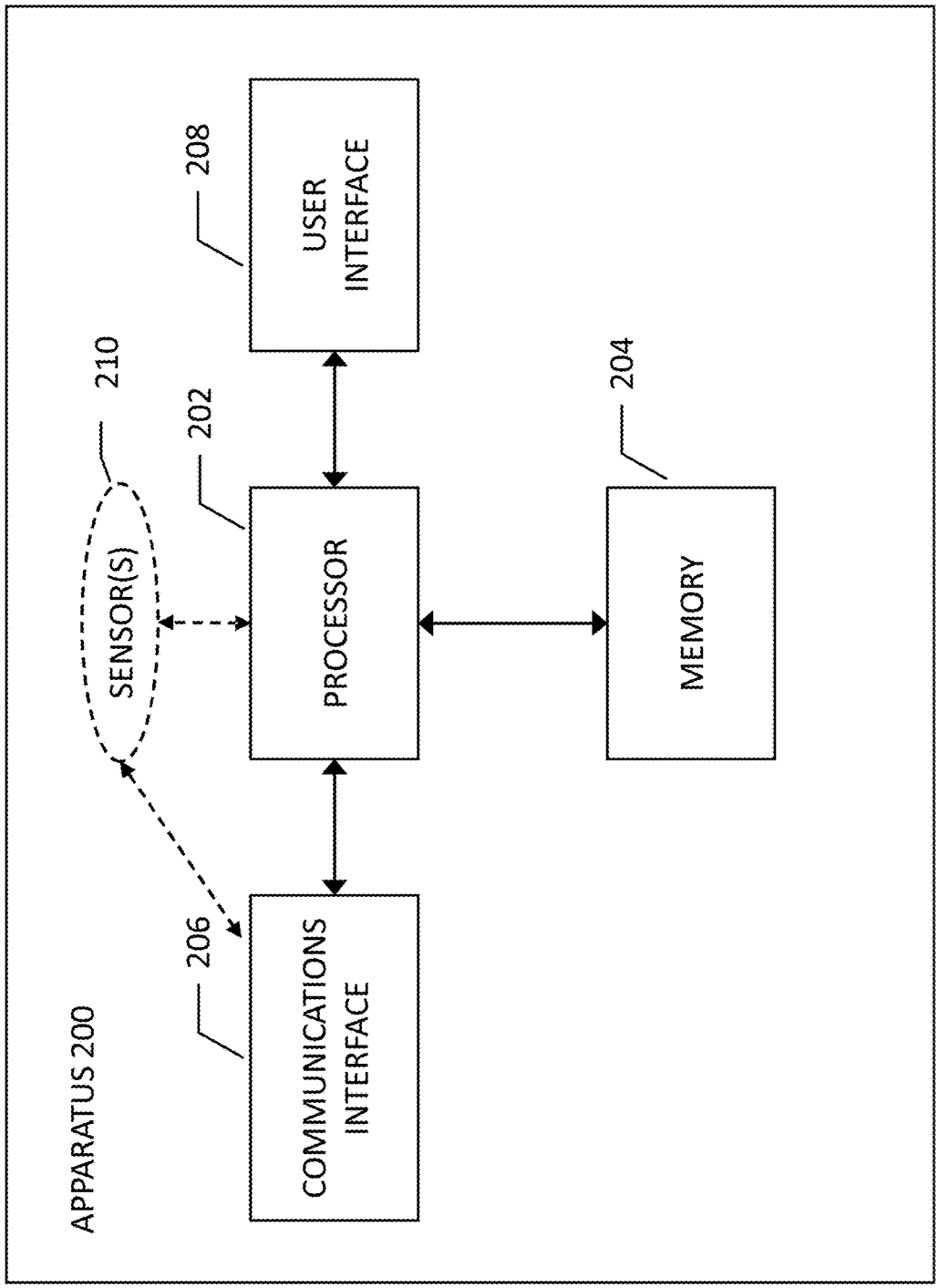

FIG. 2 is a block diagram of an apparatus that may be specifically configured in accordance with an example embodiment.

FIG. 3A-3E are graphical representations illustrating different road network configurations comprising intersections.

Figure 4:
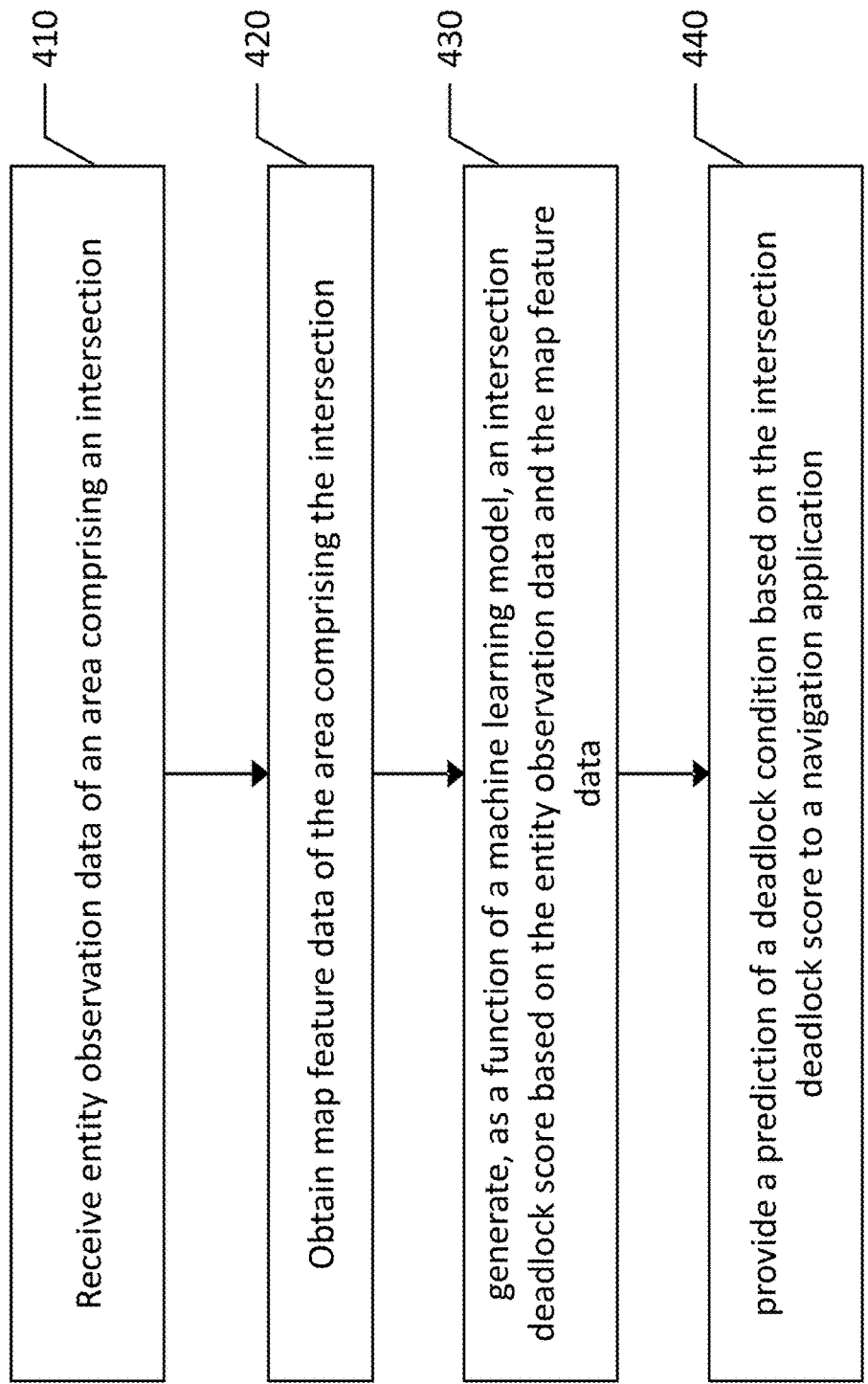

FIG. 4 is a flowchart of operations for providing a prediction of an intersection deadlock condition to a traffic application according to an example embodiment of the present disclosure.

Figure 5:
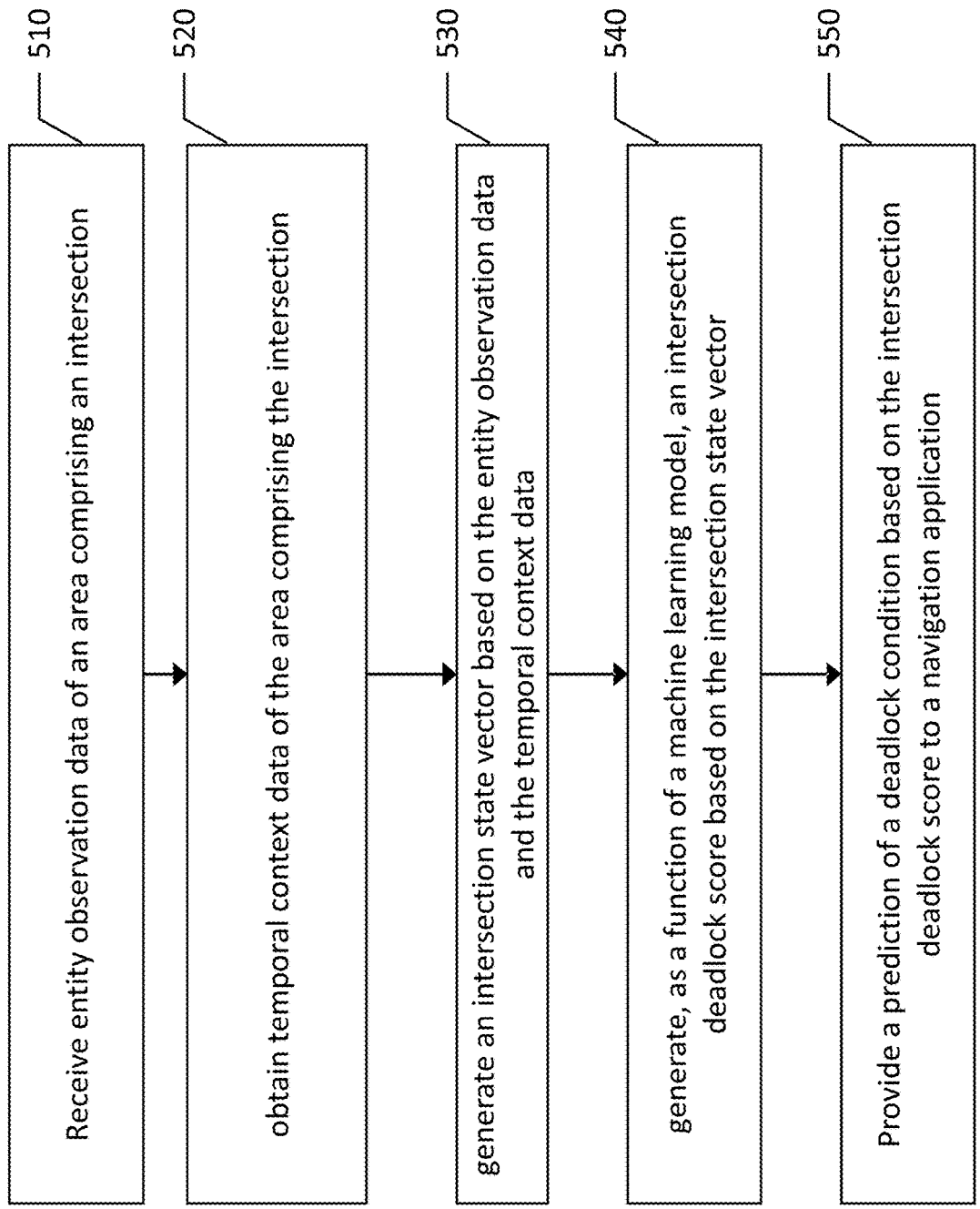

FIG. 5 is another flowchart of operations for providing a prediction of an intersection deadlock condition to a navigation application according to an example embodiment of the present disclosure.

Figure 6:
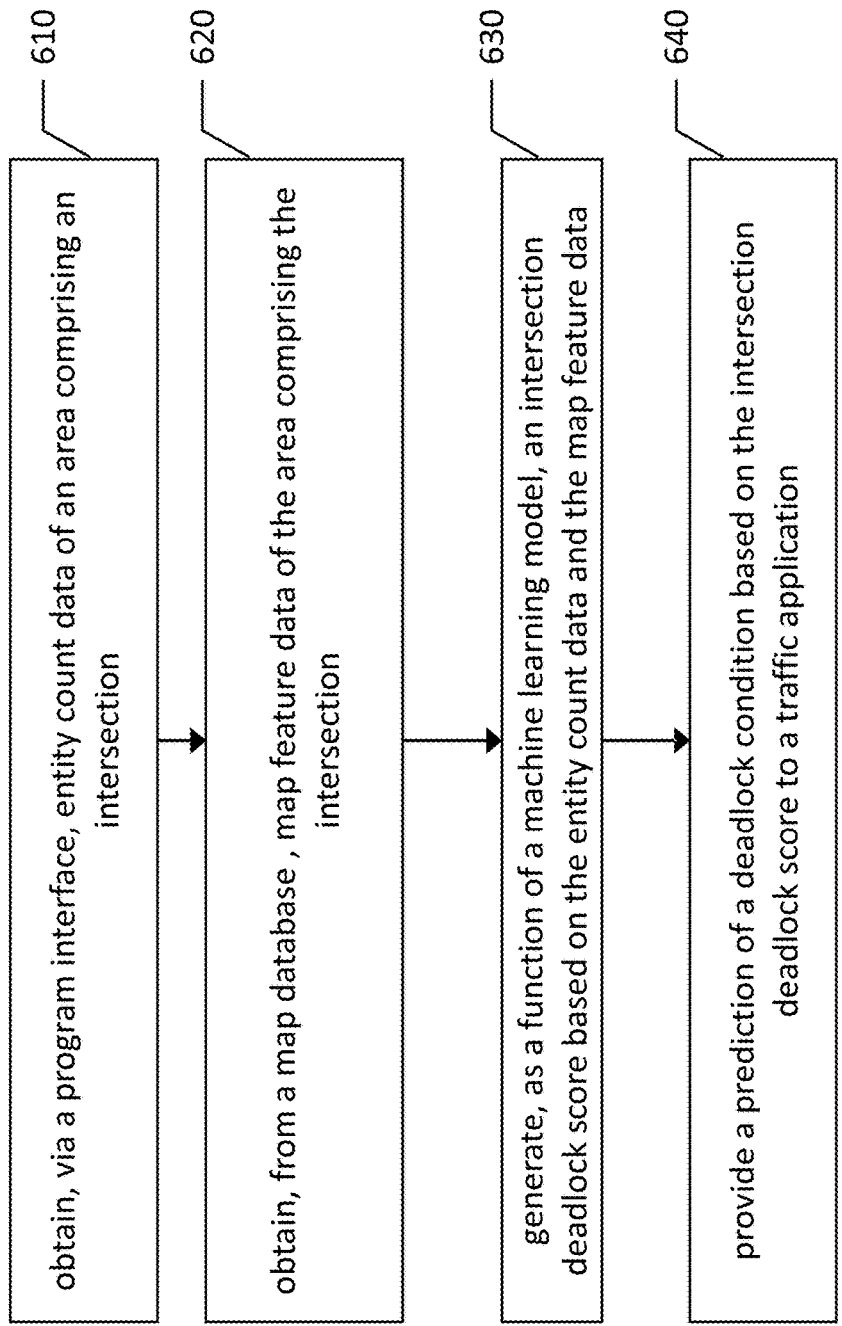

FIG. 6 is another flowchart of operations for providing a prediction of an intersection deadlock condition to a traffic application according to an example embodiment of the present disclosure.

Figure 7:
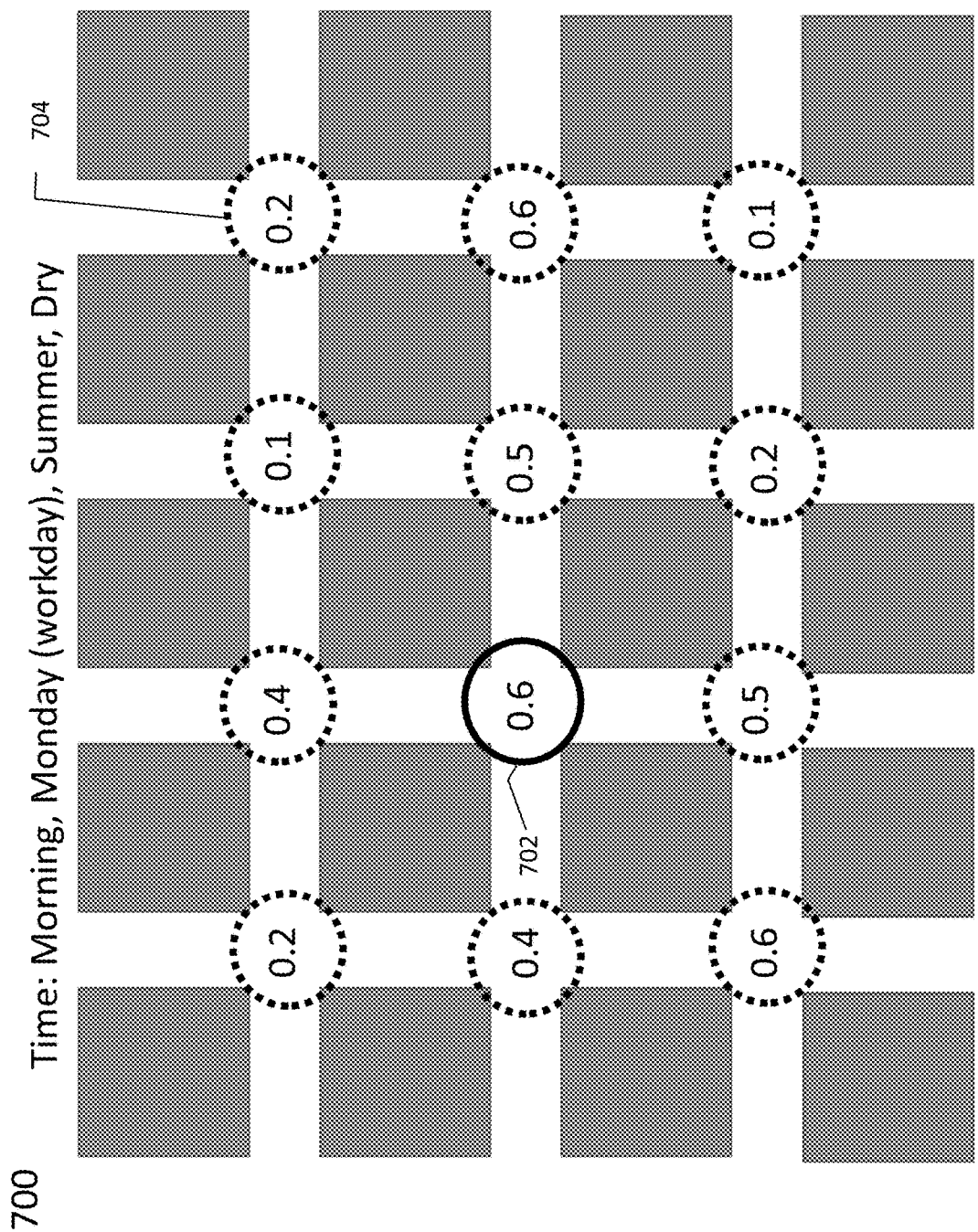

FIG. 7 depicts example intersection deadlock scores on a set of intersections of an example road configuration.

DETAILED DESCRIPTION

Some embodiments of the present invention will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A system, method, apparatus, non-transitory computer-readable storage medium and computer program product are provided in accordance with an example embodiment to provide a prediction of a deadlock condition.

The system, apparatus, method, etc. described above may be any of a wide variety of computing devices and may be embodied by either the same or different computing devices. The system, apparatus, etc. may be embodied by a server, a computer workstation, a distributed network of computing devices, a personal computer or any other type of computing device. The system, apparatus, etc. configured to provide a prediction of a deadlock condition may similarly be embodied by the same or different server, computer workstation, distributed network of computing devices, personal computer or other type of computing device.

Alternatively, the system, apparatus, method may be embodied by a computing device on board a vehicle, such as a computer system of a vehicle, e.g., a computing device of a vehicle that supports safety-critical systems such as the powertrain (engine, transmission, electric drive motors, etc.), steering (e.g., steering assist or steer-by-wire), and/or braking (e.g., brake assist or brake-by-wire), a navigation system of a vehicle (e.g. infotainment unit), a control system of a vehicle, an electronic control unit of a vehicle, an autonomous vehicle control system (e.g., an autonomous-driving control system) of a vehicle, a mapping system of a vehicle, an Advanced Driver Assistance System (ADAS) of a vehicle), or any other type of computing device carried by the vehicle. Still further, the apparatus may be embodied by a computing device of a driver or passenger on board the vehicle, such as a mobile terminal, e.g., a personal digital assistant (PDA), mobile telephone, smart phone, personal navigation device, smart watch, tablet computer, or any combination of the aforementioned and other types of portable computer devices.

FIG. 1 provides an overview of a system according to example embodiments. A location services provider 116 is shown, comprising a map database 108 and a processing server 102. The location services provider 116 is in communication with mobile device(s) 114 and entity observation data source(s) 118, over a network 112. The location services provider 116 may be embodied by a computer, a server, a cloud computing environment, a distributed computing arrangement, any other similar computing device or arrangement of computing devices. In some embodiments, the location services provider 116 may be connected over the network 112 to the map database 108 and/or to the processing server 102 in case the map database 108 and/or the processing server 102 reside in locations different to that of the location services provider 116. Alternatively, the map database 108 and the processing server 102 may be connected over a private network, either distinct/isolated from network 112 or virtualized over (at least a portion of) the network 112.

The network 112 may be one of a wired network, wireless network, or combination thereof, capable of carrying data to and from communication interfaces of the different components of the system. The network 112 can be configured to communicate in accordance with various wireless protocols including, WiFi, WiMAX, Global System for Mobile Communications (GSM), such as but not limited to Long Term Evolution (LTE), 3G, 4G, 5G, 6G, etc., or any other technology suitable for delivery of data packets over a network. In this regard, the network 112 can include, for example, an antenna (or multiple antennas) and supporting hardware and/or software for enabling communications with a wireless communication network. Additionally, or alternatively, the network interface can include the circuitry for interacting with the antenna(s) to cause transmission of signals via the antenna(s) or to handle receipt of signals received via the antenna(s) and/or may alternatively support vehicle to vehicle or vehicle to infrastructure wireless links. In addition, the network 112 can also support wired communication over fiber optic networks, DSL, Cable Internet using any suitable protocol for data packet transfer, such as IPv4, IPV6, etc.

The mobile device(s) 114 may be embodied by a portable device, such as a mobile phone, smartphone, wearable electronics or the like carried/worn by a user, but also as a positioning device, navigation device, infotainment device, simultaneous localization and mapping (SLaM) device, advanced driver assistance system (ADAS), or similar device associated and/or onboard a vehicle, robot, drone, or any other vessel capable of being mobile. The mobile device(s) 114 are capable of reporting their own position, for example by using a pre-defined reference frame (e.g. lat,lon coordinates in WGS-84 format, map-matched location with current road-link identifier and an offset along said road-link, an OpenLR location reference, etc.) and a corresponding timestamp. In addition, the mobile device(s) 114 may further report a heading, speed, elevation, slope, etc. corresponding to the reported position at the given timestamp. These data points are hereinafter referred to as probe data points.

The entity observation data source(s) 118 may comprise road-proximate and/or road-embedded infrastructure devices, such as traffic cameras, speed cameras, pneumatic road tubes, IR-light switches, induction loops, doppler radar microwave sensors, etc. configured to report entity observations of a given area associated with a field of detection of a corresponding infrastructure device. The entity observation data source(s) 118 may also comprise databases, online services and the like which provide equivalent entity observations of a given area, which may have been acquired using similar road-proximate and/or road-embedded infrastructure devices, via population count data (e.g. derived from mobile/cellular signals), via manual surveying (e.g. personnel counting entities on the road, counting entities, adjacent to the road, etc.), and/or other similar data sources. Such databases, online services and the like may allow for querying e.g., via APIs, and in turn reply with entity observations about a given area. In general terms, the entity observation data source(s) 118 provides insight into occupation of a given area by mobile entities and flow of such mobile entities through the given area. The entity observation data may further be provided as an entity count within the area for a time window. The time window may be expressed in seconds, minutes, hours, days, etc., or may correspond to an average entity observation data determined for a repeating time period (e.g., morning(s), afternoon(s), nights(s), weekday(s), weekend(s), said periods on a given season, said periods under a weather condition, event(s), combinations thereof, etc.). The entity count may further be provided as classified entity type count, the classification based on at least one of vehicular probe data, pedestrian probe data, image-based vehicle count data, image-based pedestrian count data, or a combination thereof. Vehicular probe data or image-based vehicle count data data refers to a number of vehicles in the area of the intersection, while pedestrian probe data or image-based vehicle count data refers to a number of people in the area of the intersection.

Returning to the map database 108, the map database 108 may include various types of geographic data, hereinafter also referred to as map feature data. This data may include but is not limited to node (e.g. intersection) data, road segment, road link or road feature data, map object data, point of interest (POI) data, traffic data, sidewalk data, etc. Map feature data may include further attributes descriptive of the map feature data, such as one of a lane count, functional class, traffic light information, speed limit information, adjacent POI information, or a combination thereof for each respective road segment. The map database 108 may further include intersection processing data records.

Intersection processing data records may include computer code instructions and/or algorithms for executing a machine learning model capable of providing a prediction of a deadlock condition(s). Intersection processing records may further include data indicating: (1) intersection deadlock scores associated with different intersections; (2) generalized intersection deadlock vector(s); or (3) a combination thereof. The map database 108 may include temporal context data associated with an area comprising the intersection. The temporal context data may include intersection deadlock scores associated with different intersections. Records may have an associated timestamp, such that these can be selected and/or retrieved according to a time period relevant to the prediction.

In one embodiment, the following terminology applies to the representation of geographic features in the map database 108. A "Node" (such as 308*a-e* of FIG. 3A-E)—is a point that terminates a link, a "road/line segment"—is a straight line connecting two points, and a "Link" (or "edge", such as 306*a-e* of FIG. 3A-E) is a contiguous, non-branching string of one or more road segments terminating in a node at each end. In one embodiment, the map database 108 follows certain conventions. For example, links do not cross themselves and do not cross each other except at a node. Also, there are no duplicated shape points, nodes, or links. Two links that connect each other have a common node. Most nodes on map database 108 represent intersections. However, some nodes may end links, which represent cul-de-sacs in a road network.

The map database 108 may also include cartographic data, routing data, and/or maneuvering data as well as indexes. According to some example embodiments, the road segment data records may be links or segments representing roads, streets, or paths, as may be used in calculating a route or recorded route information for determination of one or more routes. The node data may be end points (e.g., intersections, cul-de-sacs) corresponding to the respective links or segments of road segment data. Each link and node may be uniquely identified in the map database 108, for example by a LinkID or NodeID. Depending on the convention utilized by the map database 108, a circular-type intersection (such as a roundabout) may be represented by a single node or by multiple nodes and links connecting incoming/outgoing links to the circular-type intersection. For simplicity, the present application handles circular-type intersections as corresponding to a single node. It should be apparent that embodiments may also be adapted to operate on circular-type intersections represented by multiple nodes and links. The road link data and the node data may represent a road network, such as used by vehicles, cars, trucks, buses, motorcycles, bikes, scooters, and/or other entities.

Optionally, the map database may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The map database 108 may be maintained by a content provider e.g., the location services provider 116 and may be accessed, for example, by the location services provider 116's processing server 102. By way of example, the map data service provider can collect geographic data and dynamic data to generate and enhance the map database and dynamic data such as traffic-related data contained therein. There can be different ways used by the map developer to collect data, which include obtaining data from other sources, like municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device, as they travel the roads throughout a region.

The map database 108 may be a master map database, such as an HD map database, stored in a format that facilitates updates, maintenance, and development. For example, the master map database or data in the master map database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map database 108 may be a master geographic database, but in alternate embodiments, a client-side map database may represent a compiled navigation database that may be used in or with end user devices to provide navigation and/or map-related functions. For example, the map database may be used with the mobile device to provide an end user with navigation features. In such a case, the map database can be downloaded or stored on the end user device which can access the map database through a wireless or wired connection, such as via a processing server and/or a network, for example.

FIG. 2 describes an apparatus in accordance with embodiments described herein. An apparatus 200 includes, is associated with, or is in communication with processor 202, memory 204, a communication interface 206 and optionally a user interface 208. For example, the apparatus 200 may be embodied by the processing server 102 of the location service provider 116. In addition, the apparatus 200 may include or be in communication with sensors 210, either via an internal connection (e.g. bus) or over the communication interface 206. In some embodiments, the processing circuitry 202 (and/or co-processors or any other processors assisting or otherwise associated with the processing circuitry) can be in communication with the memory 204 via a bus (not shown) for passing information among components of the apparatus 200. The memory 204 can be non-transitory and can include, for example, one or more volatile and/or non-volatile memories. In other words, for example, the memory 204 may be an electronic storage device (for example, a computer readable storage medium) comprising gates configured to store data (for example, bits) that can be retrievable by a machine (for example, a computing device like the processing circuitry). The memory 204 can be configured to store information, data, content, applications, instructions, or the like for enabling the apparatus to carry out various functions in accordance with an example embodiment of the present disclosure. For example, the memory 204 can be configured to buffer input data for processing by the processing circuitry. Additionally, or alternatively, the memory 204 can be configured to store instructions for execution by the processing circuitry.

The processor 202 can be embodied in a number of different ways. For example, the processing circuitry may be embodied as one or more of various hardware processing components such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally, or alternatively, the processing circuitry can include one or more processors configured in tandem via the bus to enable independent execution of instructions, pipelining and/or multithreading.

In an example embodiment, the processor 202 can be configured to execute instructions stored in the memory 204 or otherwise accessible to the processing circuitry. Alternatively, or additionally, the processing circuitry can be configured to execute hard coded functionality. As such, whether configured by hardware or software methods, or by a combination thereof, the processing circuitry can represent a unit (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 200 of an example embodiment can also include the communication interface 206 that can be any components such as a device or circuitry embodied in either hardware or a combination of hardware and software that is configured to receive and/or transmit data from/to other electronic devices in communication with the apparatus, such as a map database 108 which, in one embodiment, comprises a map database that stores data (e.g., one or more map objects, POI data, etc.) generated and/or employed by the processor 202. Additionally, or alternatively, the communication interface can be configured to communicate in accordance with various wireless protocols including Global System for Mobile Communications (GSM), such as but not limited to Long Term Evolution (LTE), 3G, 4G, 5G, 6G, etc. In this regard, the communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally, or alternatively, the communication interface can include the circuitry for interacting with the antenna(s) to cause transmission of signals via the antenna(s) or to handle receipt of signals received via the antenna(s). In some environments, the communication interface can alternatively or also support wired communication and/or may alternatively support vehicle-to-vehicle (V2V) or vehicle-to-infrastructure wireless links. For example, the communications interface 206 may establish connections with other components via the network 112 of FIG. 1.

In certain embodiments, the apparatus 200 can be equipped or associated with one or more sensors 210, such as one or more GNSS sensors, one or more accelerometer sensors, one or more light detection and ranging (LiDAR) sensors, one or more radar sensors, one or more gyroscope sensors, and/or one or more other sensors. Any of the one or more sensors may be used to sense information regarding movement, positioning and location, and/or orientation of the apparatus for use, such as by the processor 202, in navigation assistance and/or autonomous vehicle control, as described herein according to example embodiments.

In certain embodiments, the sensors 210 of the apparatus 200 may further comprise or be in communication with one or more camera systems (not shown). In some example embodiments, the one or more camera systems can be implemented in an entity observation data source 118, a mobile device 114 (such as a vehicle) or in other remote apparatuses. For example, information detected by the one or more cameras can be transmitted to the apparatus 200, such as the processor 202, as image data. The data transmitted by the one or more cameras can be transmitted via one or more wired communications and/or one or more wireless communications (e.g., near field communication, or the like). In some environments, the communication interface 206 can support wired communication and/or wireless communication with the one or more camera sensors. Other sensors 210 of the apparatus 200 may include pressure-, infrared-, magnetometer-, acoustic-, piezoelectric-, and/or microwave-based vehicle counting equipment, such as pneumatic road tubes, IR-light switches, induction loops, doppler radar microwave sensors, etc.

The apparatus 200 may also optionally include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry embodied by the processing circuitry may be configured to control one or more functions of one or more user interface elements through computer program instructions (for example, software and/or firmware) stored on a memory accessible to the processing circuitry (for example, memory 204, and/or the like).

In certain embodiments, an entity observation data source 118 and/or a mobile device 114 may be embodied by an apparatus similar to the described apparatus 200, including similar components and capabilities as described above.

Certain embodiments provide for a prediction of a road network intersection condition. An intersection deadlock condition, or simply deadlock condition, may be one of the intersection conditions for which a prediction may be made. Other intersection conditions may include an empty intersection (e.g., no entities observed), nominal intersection (e.g., regular traffic), congested intersection or the like (e.g., heavy traffic).

Figure 3A:
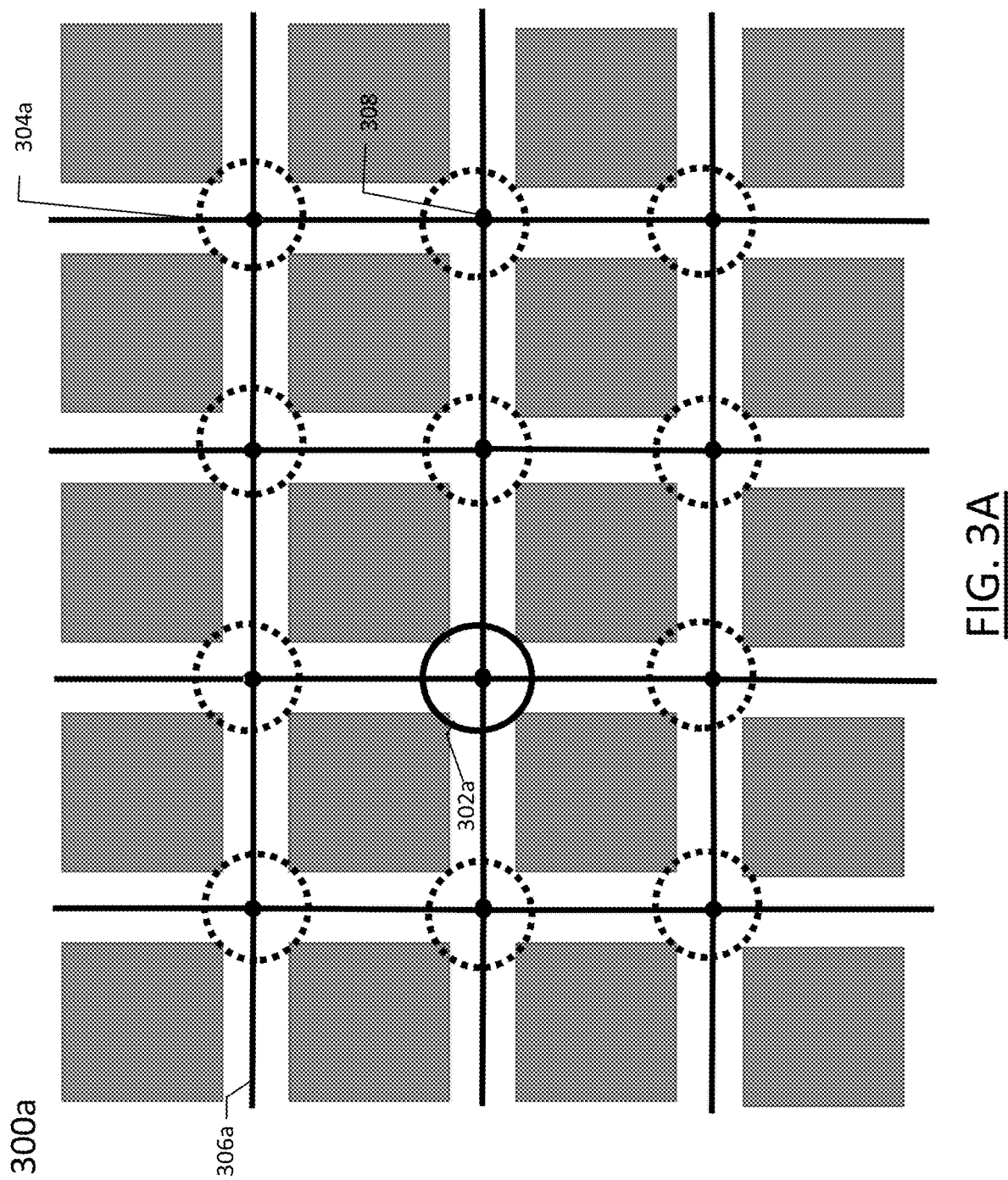
Figure 3B:
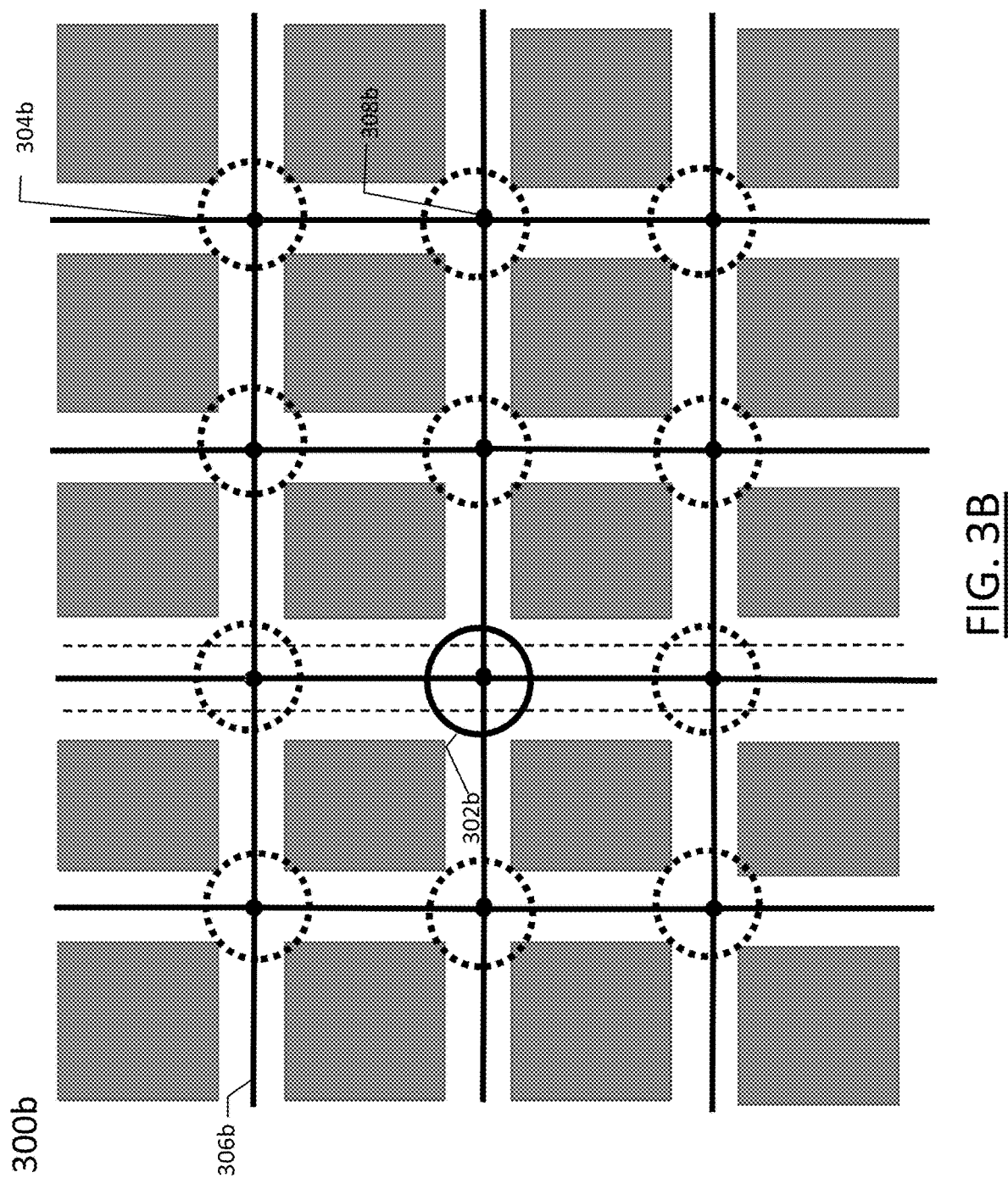
Figure 3C:
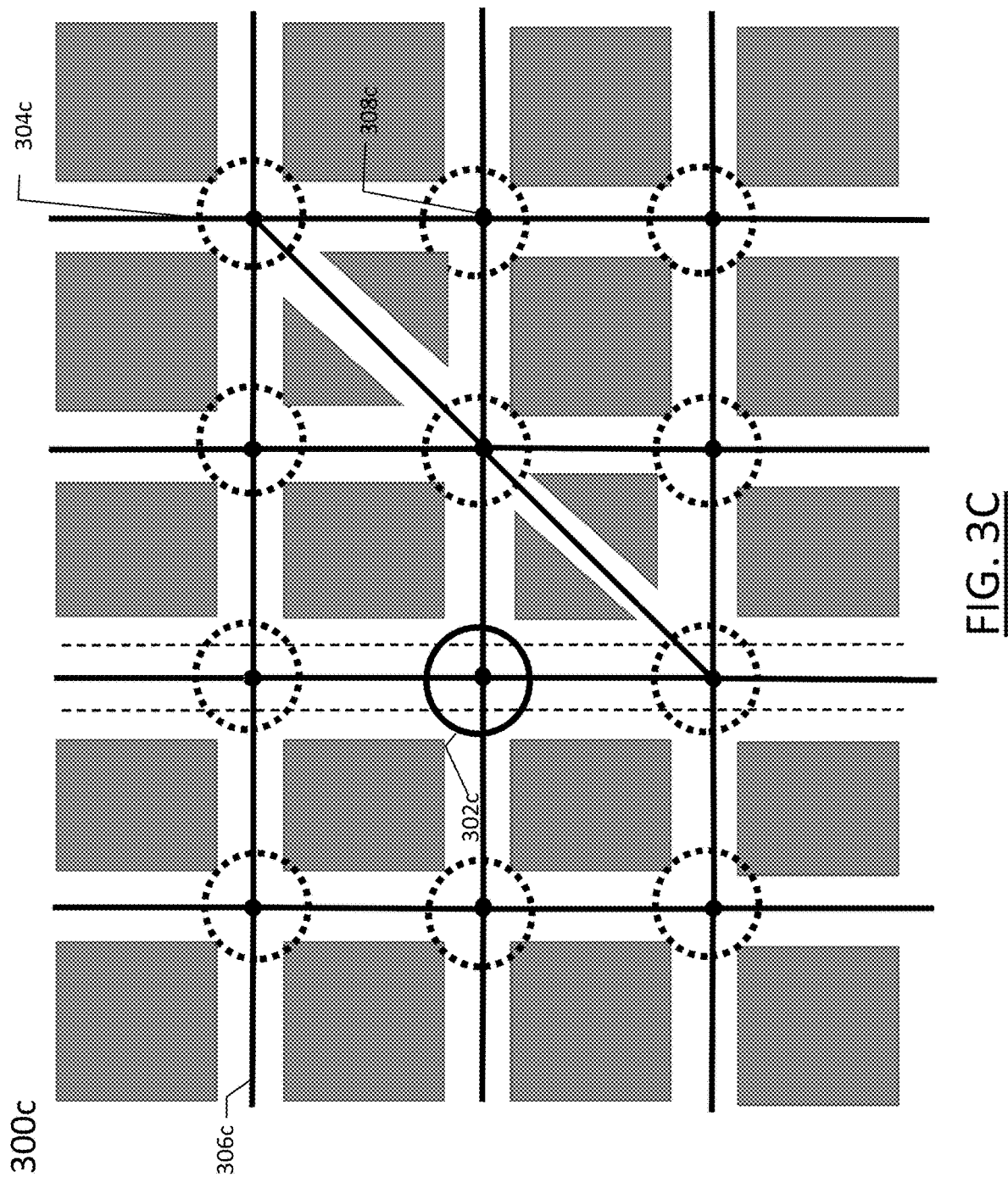
Figure 3D:
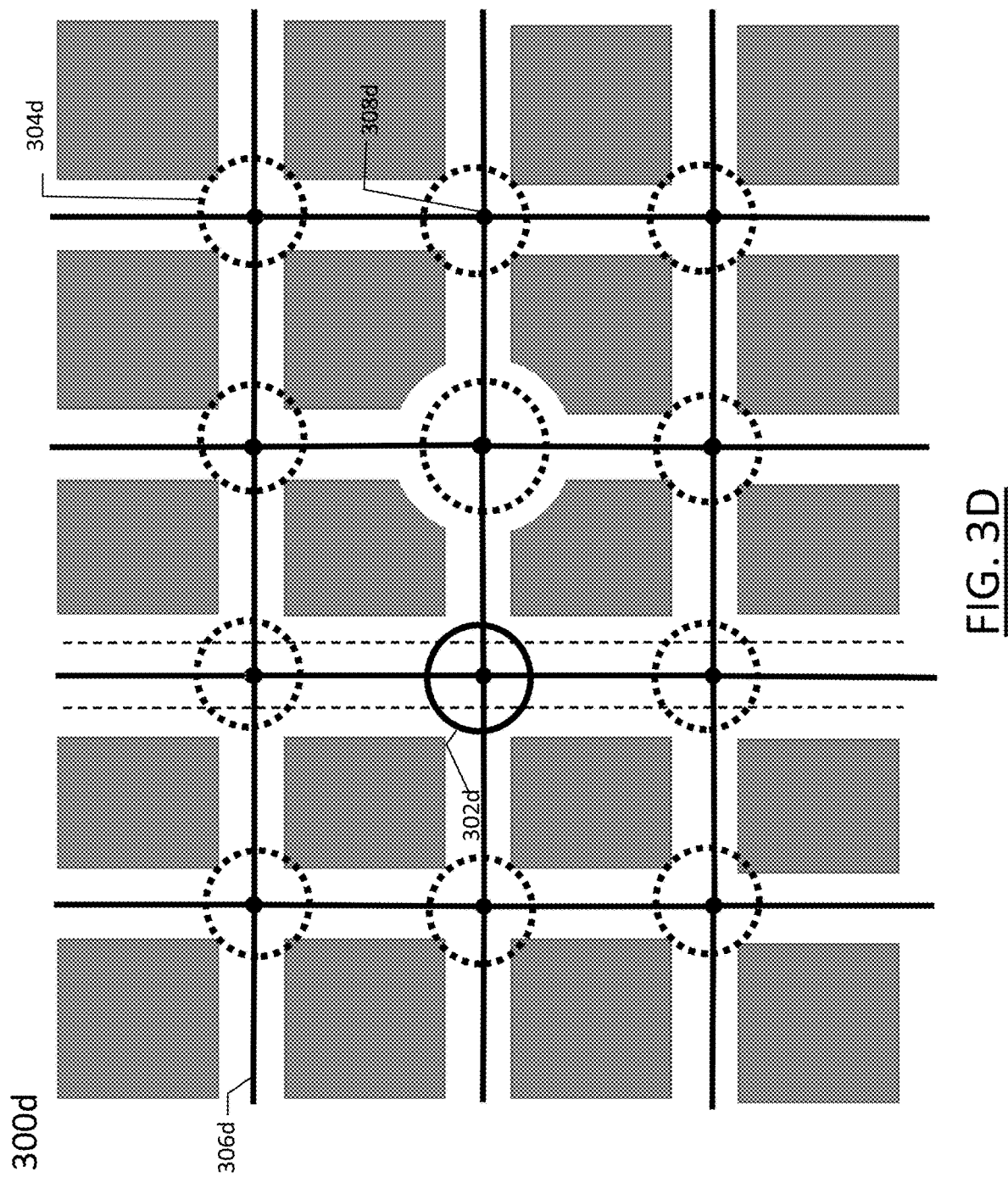
Figure 3E:
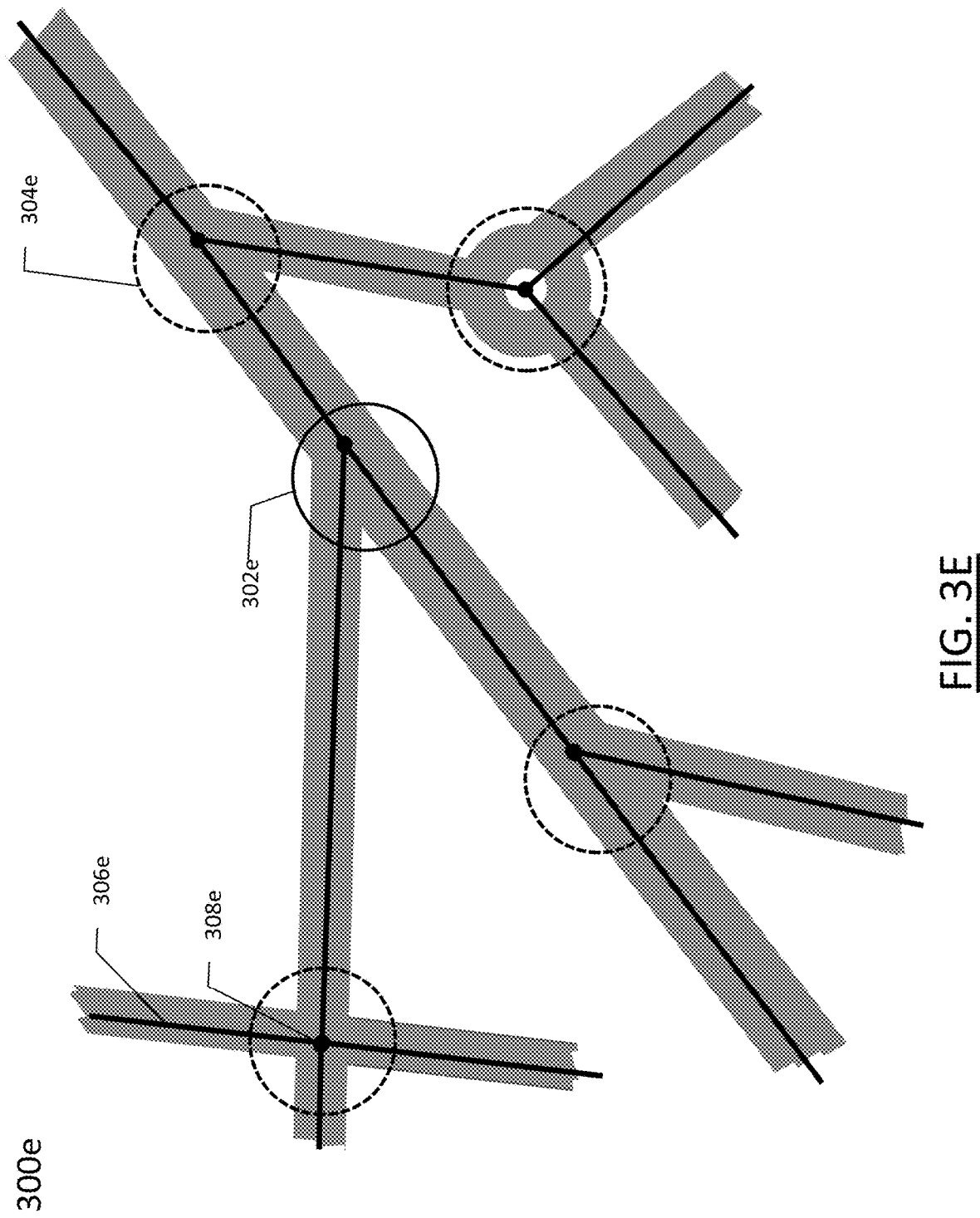

FIGS. 3A-E depict several road network configurations for which example embodiments may be applied. It should be clear that different road network configurations are abundant and example embodiments may be applied to them. For example, FIG. 3A depicts a road configuration 300a comprising multiple links 306a and nodes 308a for which an intersection condition for intersection 302a may be predicted. Intersection conditions for neighboring intersections 304a (denoted by dotted circles) may also be considered for predicting the intersection condition for intersection 302a. In other use cases, the intersection of interest, may be any other intersection, for instance, one of the neighboring intersections 304a. An intersection 302a or 304a may be associated with their respectively co-located node 308a. Other road network configurations may include roads with different characteristics and/or features, such as road network configuration 300b of FIG. 3B depicting a two-lane, two-way avenue, road configuration 300c of FIG. 3C depicting a transversal road or road configuration 300d of FIG. 3D depicting a roundabout. The road density of the road configurations can be considered consistent with an urban environment, for which intersection condition predictions can be provided. Still, FIG. 3E provides an example road configuration 300e, which depicts a road configuration consistent with rural and/or arterial roads, for which example embodiments for providing intersection condition predictions are also applicable. As in FIG. 3A, FIGS. 3B-E also depict a road configurations comprising multiple links 306a and nodes 308a.

In order to provide an intersection condition prediction for intersections, such as intersections 302a-e, certain embodiments obtain or otherwise receive or acquire entity observation data of an area comprising an intersection. Entity observation data can be obtained from different sources, such mobile devices 114, entity observation data sources 118, or other intersection adjacent equipment. For detecting deadlock conditions, entity observation data obtained from mobile devices may come in the form of probe data points. Probe data points indicating deadlock conditions would be characterized by very low speed (e.g. under 5 km/h) per probe data point and several probe data points corresponding to approximately the same location, provided the location is not a parking/breaking spot, but corresponds to a portion of the road link where traffic is supposed to flow. If more than one mobile device ID generates probes with deadlock characteristics at approximately the same time and location, a deadlock could be predicted with even greater confidence. Resulting entity observation data from a mobile device indicating a deadlock condition may include a count of mobile devices reporting conditions in the area that includes the intersection, for instance deadlock conditions.

An entity observation data source 118 equipped with e.g. computer vision capabilities may also provide entity observation data indicative of a deadlock condition. For instance, cameras pointed at an intersection would differentiate between seeing a scene with many different cars and seeing the same cars for an extended period of time. If the same cars are detected for longer than a threshold amount of time, a deadlock would be reported until the cars in the camera's (or cameras') line of sight change at a higher rate again. The entity observation data source 118 may then provide entity observation data indicating a deadlock condition. Further, the entity observation data source 118 may include a count of entities occupying the area that includes the intersection for a given time period. Other entity observation data sources 118, such as aforementioned pneumatic road tubes, IR-light switches, induction loops, doppler radar microwave sensors, etc., may provide similar entity observation data indicative of a deadlock condition. Similarly, these other entity observation data sources 118 may further provide a count of entities occupying the area that includes the intersection for a given time period. It should be stated that the area of the intersection may include not only the intersection and/or roundabout itself but may also extend to cover a portion of the road segments connected the intersection and/or roundabout.

In some embodiments entity observation data may further include a classified entity type count based on at least one of vehicular probe data, pedestrian probe data, image-based vehicle count data, image-based pedestrian count data, or a combination thereof. An intersection may experience a deadlock condition for a variety of reasons. For example, an intersection may reach a high vehicle count during e.g., peak traffic, a road accident, emergency operations, or other events that impede vehicular flow. A classified entity type count in such a situation may determine that n vehicles are currently present and stationary in the area of the intersection, according to vehicle probe data and/or image-based vehicle count data. Similarly, an intersection may reach a high pedestrian count during e.g., peak traffic, accidents, marches, protests, outdoor events, or other events that impede pedestrian flow. A classified entity type count in such a situation may determine that n pedestrians are currently present and stationary in the area of the intersection, according to pedestrian probe data and/or image-based pedestrian count data. Whether a count of n vehicles or n pedestrians may be considered to be high or over a threshold (e.g. N vehicles) to identify a gridlock condition may be dependent on the characteristics of the intersection and/or the road segments connecting to the intersection.

In general, the entity observation data may also identify an intersection, for example by coordinates (expressed in WGS-84 lat, lon) or by reference to a map data node ID. The entity observation data may further include an observation flag (e.g. deadlock, empty, nominal, congested, etc.), an associated confidence value, and a validity period for the observation (e.g. with a start/end timestamp).

Certain embodiments may further obtain from a map database, such as the map database 108, map feature data of the area comprising the intersection. As mentioned above, the area comprising the intersection may also include portions of the road links connected to the intersection. Map feature data may therefore comprise a number of intersection attributes like intersection type (e.g. T-Intersection, Cross Intersection, five-or-more leg non circular, Y-Intersection, roundabout, combinations thereof, etc.), permitted/forbidden maneuvers, traffic lights, intersection dimensions, etc. The map feature data may further include road feature data of a plurality of road segments connected to the intersection, for example, a lane count, functional class, traffic light information, speed limit information, adjacent POI information, or a combination thereof for each respective road segment. Such map data features provide an insight into the characteristics of an area including an intersection, allowing not only for estimation of an intersection's capacity, but also for comparison with other areas including intersections that may share similar characteristics.

Certain embodiments may also obtain temporal context data of the area of the intersection. Different situations during different times may result in an intersection experiencing different conditions. It should also be apparent that the temporal context may correspond to a time period (e.g., morning(s), afternoon(s), nights(s), weekday(s), weekend(s), holiday(s) said time periods on a given season), but that the temporal context may also include dynamic events occurring at said periods, for example weather condition(s), traffic, organized event(s), accident(s), traffic light failure(s), or even combinations thereof. For example, an intersection may be experiencing a gridlock condition during a rush hour, in winter during a snowstorm. However, the same intersection may not experience a gridlock condition during rush hour, in winter, when the weather is clear. The difference in temporal contexts of the area of the intersection may provide insight into the situation that led to the deadlock condition. In addition, the temporal context data may also comprise intersection deadlock scores of the intersection and/or intersections proximate to the area of the intersection. Intersection deadlock scores may be further associated to a given time (or time range) via a timestamp, enabling a historical record of said scores. Within a temporal context, intersection deadlock scores may provide further insight for e.g., a machine learning model, to provide a more accurate prediction. Intersection deadlock scores will be discussed in more detail below. It should be apparent that multiple permutations of temporal context can be made for any given area of an intersection, leading to similar insights about intersection conditions.

Certain embodiments make use of one or more intersection state vectors. An intersection state vector comprises a set of data points that represent a state and a context of the area including the intersection. The intersection state vector provides an encoding of the entity observation data into machine-readable and generalizable vectors, while augmenting these with context pertaining to the observations. The following Table 1 provides a non-limiting example of an intersection state vector:

| Feature Type | Feature | Comment |
|---|---|---|
| WHERE | Link ID | Map-match lat/long of observation to underlying link |
| | Intersection or Node ID | identify the intersection to which the link is connected (e.g. a node in the underlying map model). This allows grouping different detections of the same incident from e.g. different vehicles located on different links belonging to the same intersection and replace those several incidents with a single, higher-confidence record. adding intersection-level features |
| | Number of links connected to intersection | |
| | Functional Class of links connected to Intersection | |
| | Traffic lights present | |
| | POI proximity | proximity of particular POIs like gas stations, parking garages, drive-thru services, etc. |
| | . . . (further features of link and/or intersection) | |
| WHEN | Timestamp | The timestamp can be generalized by the fields below |
| | Duration | |
| | Time of Day | |
| | Weekend yes/no | |
| | Holiday yes/no | |
| | Season of year | |
| | Weather | Generic (fair, clear, poor) or specific (mm of rain, cm of snow, humidity, temperature . . .) |
| | Event | |
| | Traffic Landscape | beyond the immediate observation, describes the traffic conditions in an area including the intersection in question, optionally not only for the time of the observation but also a time window leading up to it, to allow early recognition of patterns that lead to deadlocks. |
| WHAT | Count of entities | # of vehicles, # pedestrians, etc. |
| | Count Confidence | e.g. in % |
| | Observation flag | e.g. deadlock, empty, nominal, congested, etc. |
| | Flag Confidence | e.g. in % |

In certain embodiments, intersection state vectors may be generated for multiple observations at different points in time of the same area including an intersection and/or for other areas including other intersections, also at different times. A set of intersection state vectors may be labelled as corresponding to an intersection condition, such as deadlock, empty, nominal, congested, etc. The label may be obtained 1) from the entity observation data source 118 directly, for example as the "Observation Flag" of Table 1, 2) from analysis of mobile device 114 probe data indicating an entity count and flow within a range associated to a respective intersection condition, 3) be applied after verification of the situation at the area including the intersection (e.g. by surveying methods), or 4) by way of similar processes that reliably determine a current intersection condition. The intersection state vector set may also provide labelling for identifying observations prior and/or leading to an intersection condition, such as a deadlock condition. Such a set of verified intersection state vectors serves as a ground truth set for training a machine learning model. The machine learning model may be a supervised machine learning model, such as a linear regression model, a support vector machine (SVM), a decision tree, or similar supervised machine learning models. By training the machine learning model using the ground truth set, the machine learning model is able to map observations to intersection conditions, thus enabling the model to predict when a given intersection state vector may lead to an intersection condition. The output may be provided in form of an intersection deadlock score, representing the likelihood of an area around an intersection experiencing an intersection condition, e.g. deadlock condition. The intersection deadlock condition may represent the likelihood of the area including an intersection of being "in deadlock". For example, a highest likelihood range may be associated with the "deadlock" condition, a next lower likelihood range with a "congested" condition, a next lower likelihood range with a "nominal" condition, and so on. An intersection deadlock score may be provided as a normalized score (e.g. 0 to 1 range), a discrete number (e.g. 1-10, 1-100), discrete scale (alphabetical order, color coded), or any other suitable encoding for expressing a probability. FIG. 7 depicts example Intersection Deadlock Scores that have been calculated for a set of intersections on a road configuration during an example time period (in FIG. 7, "Morning, Monday (workday), Summer, Dry").

In some embodiments, a prediction of an intersection condition (e.g. a deadlock condition) of a specific area including an intersection may be provided. In such cases, an intersection-specific model may be trained. As in this case the area of the intersection in question is only one area, area features remain constant. Therefore, training of the machine learning model may discard "WHERE" vector features (such as in Table 1) that describe the area including the intersection and be trained with "WHEN" and "WHAT" vector features. The machine learning model may then provide for output of an intersection condition based on the "WHEN" and "WHAT" features of the area of the intersection.

When a prediction of an intersection condition (e.g. a deadlock condition) is to be provided, some embodiments may proceed to generate an intersection state vector corresponding to the area of the intersection of interest. Current entity observation data corresponding to the area of the intersection is provided as the "WHAT" component(s) of the intersection state vector, while temporal context data of the area of the intersection is provided as the "WHEN" component(s) of the intersection state vector. An intersection deadlock score based on the intersection state vector is generated as a function of a machine learning model, such as the model(s) described above. In other words, the intersection state vector is taken as an input for the machine learning model, which in turn, provides a likelihood of the intersection state vector corresponding to an intersection condition. The output may be provided in form of an intersection deadlock score, representing the likelihood of an area around an intersection experiencing an intersection condition, e.g. deadlock condition. It should be noted that the temporal context data, for example the "WHEN" features, may be extended to include intersection deadlock scores of neighboring intersections, provided these have been previously determined, for example by generating the intersection deadlock scores as a function of a machine learning model as above. In the examples of FIGS. 3A-E, the temporal context data of intersection 302a-e may include the intersection deadlock scores of intersections 304a-e. A threshold distance (Euclidean distance, Taxicab/Manhattan distance, graph distance etc.) may be applied to limit the number of intersections to be included as neighboring intersection deadlock scores as part of the temporal context.

In some embodiments, the machine learning model is based on at least one generalized intersection deadlock vector. In certain situations, there may not be available vectors based on direct observations of a specific area of an intersection. To provide for predictions of deadlock conditions for such unobserved areas, the machine learning model may be trained with intersection deadlock vectors that represent features indicative of a deadlock condition. For example, an intersection deadlock vector with WHERE features corresponding to a 4-way intersection of urban functional class roads, adjacent to a shopping mall parking garage, WHEN features corresponding to mid-December 5-6 pm, may hint towards a possible deadlock condition if WHAT values exceed an entity count threshold of 10 vehicles on the intersection. These may be assembled, generated, etc., based on averaged entity observation data, generic map features, time period partitions, etc.

In other embodiments, a prediction of an intersection condition for other previously unassessed areas including an intersection may be provided. In an example of positive transfer learning for predictions of unassessed areas, commonalities across areas including intersections may be identified. In order to detect commonalities across multiple intersection state vectors, feature entries, such as the "WHERE" type entries of Table 1, are considered. Feature specific/unique information, such as intersection/node ID, lat, lon coordinates of the intersection, link IDs, adjacent POI-IDs may be dropped or otherwise ignored. Adjacent POI IDs may be replaced by a corresponding POI type. The machine learning model may then classify the areas containing intersections according to their features and provide for output based on the "WHEN" and "WHAT" vector features. Intersection state vectors assembled, generated or the like in such form, which point towards a deadlock condition, may be considered generalized intersection deadlock vectors. Areas of intersections that match the non-specific "WHERE" attributes and that where not directly processed by the machine learning model, can be considered to "fit" the output based on the "WHEN" and "WHAT" vector features. It should be apparent that such transfer learning may be advantageous for rapidly profiling areas of intersections without the added computational expense of running the machine learning model for each individual area.

When a prediction of an intersection condition (e.g. deadlock condition) is to be provided, other embodiments may utilize current entity observation data corresponding to the area of the intersection. In addition, other embodiments may utilize map feature data corresponding to the area of the intersection. Optionally, some embodiments may proceed to generate an intersection state vector corresponding to the area of the intersection of interest, where entity observation data is provided as the "WHAT" component(s) of the intersection state vector, while map feature data of the area of the intersection is provided as the "WHAT" component(s) of the intersection state vector. Regardless of an explicit intersection state vector being used as input or if using a set of entity observation data and map feature data as input, an intersection deadlock score based on either input is generated as a function of a machine learning model, such as the model(s) described above. In other words, either input is taken for the machine learning model, which in turn, provides a likelihood of the intersection state vector or the combination of entity observation data and map feature data corresponding to an intersection condition. The output may be provided in form of an intersection deadlock score, representing the likelihood of an area around an intersection experiencing an intersection condition, e.g. a deadlock condition.

Predictions of an intersection condition, such as a deadlock condition may find application in different use cases. The following are some non-limiting examples of use cases and/or applications that may benefit from such predictions.

Deadlock-Aware Routing

A prediction of deadlock condition(s) may be received by a navigation application, which proceeds to generate a route that considers such condition(s). In the process of generating drivable routes for vehicles on the road network, for intersections along the way, an intersection deadlock score may be calculated using the trained machine learning model(s) discussed above. To this end, estimated times corresponding to the moments when a vehicle on the calculated route may reach the intersections are used to generate intersection deadlock scores predictions. The intersection deadlock scores for different routes may then be added to select the route less likely to involve deadlocks.

Alert

A prediction of deadlock condition(s) may be received by a navigation application or a traffic application. As an assistance to the driver of a vehicle, the traffic application or navigation application may constantly evaluate the likelihood of a deadlock by running the model on intersections in an area and issue an alert if the deadlock score crosses a threshold. Deadlock warnings may be provided to navigation applications for the purposes of creating routes (similar to above), or as part of traffic messages, for example using the TMC protocol. Public authorities/safety officers may be alerted by Anticipating when such situations are more likely to occur and could possibly dispatch public servants to ease the condition at the area of the intersection.

Instruct

Beyond the currently described features, some embodiments could extract further properties of detected deadlocks to derive actions conductive to resolution of deadlocks. For example, it may be determined that a car on a north-bound lane needs to move first, while the south-bound cars need to wait. If a vehicle that is in a deadlock and in one of those roles can be identified, the driver or autonomous control system of the vehicle may be advised or caused to behave in a corresponding way, as an advanced function of a navigation application or an ADAS.

Simulation of Traffic Conditions

A traffic application may provide for urban planning tools taking advantage of prediction of deadlock conditions. Traffic simulations may make use of certain embodiments to predict deadlock conditions. In such scenarios, a traffic application performing simulation would provide entity count data via a program interface, instead of relying on entity observation data from sources such as entity observation data sources 118 or mobile devices 114. A user of the traffic application could enter via the program interface e.g., an API, a user interface, a configuration file, etc., a number of vehicles, pedestrians, etc. that should be considered for the simulation. Machine learning model(s) can then be applied to provide a deadlock condition prediction, as discussed above.

FIGS. 4, 5 and 6 illustrate flowcharts depicting methods according to example embodiments of the present disclosure. It will be understood that each block of the flowcharts and combination of blocks in the flowcharts may be implemented by various components, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of components of the apparatus for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 4 illustrates a method performed by an apparatus comprising at least one processor and at least one memory including computer program code to provide a deadlock condition prediction. The memory including the computer program code cause the apparatus to, at 410, receive, from at least one sensor data source, entity observation data of an area comprising an intersection. For example, the processor 202 may execute instructions read from memory 204 to receive entity observations corresponding to an intersection 302a-e collected by sensors 210, or by an Entity Observation Data Source 118. Then, at 420, the apparatus obtains, from a map database, map feature data of the area comprising the intersection. For example, the apparatus 200 may communicate with the map database 108 via the communications interface 206 and query road data for link 306a-e, data for features near node 308a-e or any other map data features near the intersection 302a-e. At 430, the apparatus generates, as a function of a machine learning model, an intersection deadlock score based on the entity observation data and the map feature data. For example, entity observation data and map data stored in memory 204 in previous steps may be processed by processor 202 using a trained machine learning model to obtain a deadlock score for intersection 302a-e. At 440, the apparatus provides a prediction of a deadlock condition based on the intersection deadlock score to a navigation application. For example, the processor 202 may utilize the user interface 208 for providing a map view of the intersection 302a-e overlaying the obtained deadlock score, provide the deadlock score associated with the intersection 302a-e via communications interface 206 to a Location Services Provider 116, a mobile device 114, or similar.

Turning to FIG. 5, a method for providing a prediction of a deadlock condition is illustrated. At 510, the method receives, from at least one sensor data source, entity observation data of an area comprising an intersection. For example, the sensor data source may be an entity observation data source 118, sensor(s) 210 of an apparatus 200, and received entity observation data may provide insight into how many road participants are currently present at an intersection 302a-e. At 520, the method obtains temporal context data of the area comprising the intersection 302a-e. For example, a time of day, day of the week, a season, weather condition may be determined that corresponds to the desired observation of the intersection. In addition, a traffic state of the road links connected to the intersection 302a-e, a deadlock score of other intersections 304a-e and the like may be obtained as part to the temporal context data of the intersection 302a-e. Then, at 530, the method generates an intersection state vector based on the entity observation data and the temporal context data. For example, a vector may be assembled that describes the situation at intersection 302a-e, comprising entity observation data, such as count of vehicles or pedestrians, flow metrics of vehicles or pedestrians, and temporal context data, such as time of day, day of week, traffic information, weather conditions. At 540, the method proceeds to generate as a function of a machine learning model, an intersection deadlock score based on the intersection state vector. For example, the intersection state vector may be used as an input to a trained machine learning model in order to evaluate the state of the intersection 302a-e. The trained machine learning model may then compare the intersection state vector to learned examples of intersections experiencing different conditions (free flow, congestion, deadlock, etc.) At 550, the method provides a prediction of a deadlock condition based on the intersection deadlock score to a navigation application. For example, the output of the machine learning model may be provided as a normalized score for the intersection 302a-e to a navigation client, a routing engine, a location services provider or the like, so that such recipient may consider it in routing tasks, raising alerts, or in similar tasks. It should be apparent that the method may also be performed by an apparatus and/or that the method may also be encoded in a non-transitory computer-readable storage medium having computer-executable program code instructions.

Lastly, FIG. 6 illustrates a method in accordance with example embodiments. The instructions, at 610, obtain, via a program interface, entity count data of an area comprising an intersection. For example, the instructions may cause prompting an operator to enter a number of road participants that should be taken into account at an intersection 302a-e, or obtaining the number of road participants from the entity observation data source 118. At 620, the instructions obtain, from a map database, map feature data of the area comprising the intersection. For example, the instructions may cause communication with the map database 108 via the communications interface 206 and querying of road data for link 306a-e, data for features near node 308a-e or any other map data features near the intersection 302a-e. At 630, the instructions generate, as a function of a machine learning model, an intersection deadlock score based on the entity count data and the map feature data. For example, instructions may cause processing of entity count data and map data obtained in previous steps using a trained machine learning model to obtain a deadlock score for intersection 302a-e. At 640, provide a prediction of a deadlock condition based on the intersection deadlock score to a traffic application. For example, the instructions may cause raising an alert at a traffic/road infrastructure managing center that an intersection 302a-e may experience a deadlock condition based on the road participant count utilized in step 610. It should be apparent that the method may also be performed by an apparatus and/or that the method may also be encoded in a non-transitory computer-readable storage medium having computer-executable program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and computer program code configured to, with the processor, cause the apparatus to at least:
   receive, from at least one sensor data source, entity observation data of an area comprising an intersection of a road network;
   obtain, from a map database, map feature data of the area comprising the intersection;
   generate, as a function of a machine learning model, an intersection deadlock score based on the entity observation data and the map feature data;
   provide a prediction of a deadlock condition based on the intersection deadlock score to a navigation application; and
   cause the navigation application based on the prediction to: (1) alter a current path or route of a vehicle, (2) cause a routing engine to penalize a set of road elements to direct a routing algorithm to provide an alternate route, (3) cause the vehicle to initiate a mode change between an autonomous driving mode and a manual driving mode, or (4) a combination thereof.

2. The apparatus of claim 1, wherein the entity observation data further comprises an entity count within the area for a time window.

3. The apparatus of claim 2, wherein the entity count is further classified based on at least one of vehicular probe data, pedestrian probe data, image-based vehicle count data, or image-based pedestrian count data.

4. The apparatus of claim 1, wherein the intersection deadlock score is further based on temporal context data of the area comprising the intersection.

5. The apparatus of claim 4, wherein the temporal context data further comprises intersection deadlock scores of neighboring intersections of the intersection.

6. The apparatus of claim 1, wherein the map feature data of the area further comprises road feature data of a plurality of road segments connected to the intersection; and wherein the map feature data comprises one of a lane count, functional class, traffic light information, speed limit information, or adjacent POI information for each respective road segment.

7. The apparatus of claim 1, wherein the machine learning model is based on at least one generalized intersection deadlock vector.

8. A method comprising:
receiving, from at least one sensor data source, entity observation data of an area comprising an intersection of a road network;
obtaining temporal context data of the area comprising the intersection;
generating an intersection state vector based on the entity observation data and the temporal context data;
generating, as a function of a machine learning model, an intersection deadlock score based on the intersection state vector;
providing a prediction of a deadlock condition based on the intersection deadlock score to a navigation application; and
causing the navigation application based on the prediction to: (1) alter a current path or route of a vehicle, (2) cause a routing engine to penalize a set of road elements to direct a routing algorithm to provide an alternate route, (3) cause the vehicle to initiate a mode change between an autonomous driving mode and a manual driving mode, or (4) a combination thereof.

9. The method of claim 8, wherein the entity observation data further comprises an entity count within the area for a time window.

10. The method of claim 9, wherein the entity count is further classified based on at least one of vehicular probe data, pedestrian probe data, image-based vehicle count data, or image-based pedestrian count data.

11. The method of claim 8, wherein the temporal context data further comprises intersection deadlock scores of neighboring intersections of the intersection.

12. The method of claim 8, further comprising obtaining map feature data of the area comprising the intersection.

13. The method of claim 12, wherein the map feature data of the area further comprises road feature data of a plurality of road segments connected to the intersection; and wherein the map feature data comprises one of a lane count, functional class, traffic light information, speed limit information, adjacent POI information, or a combination thereof for each respective road segment.

14. The method of claim 8, wherein the machine learning model is based on at least one generalized intersection deadlock vector.

15. A non-transitory computer-readable storage medium having computer-executable program code instructions stored therein, the computer-executable program code instructions comprising program code instructions to:
obtain, via a program interface, entity count data of an area comprising an intersection of a road network;
obtain, from a map database, map feature data of the area comprising the intersection;
generate, as a function of a machine learning model, an intersection deadlock score based on the entity count data and the map feature data;
provide a prediction of a deadlock condition based on the intersection deadlock score to a traffic application; and
cause the navigation application based on the prediction to: (1) alter a current path or route of a vehicle, (2) cause a routing engine to penalize a set of road elements to direct a routing algorithm to provide an alternate route, (3) cause the vehicle to initiate a mode change between an autonomous driving mode and a manual driving mode, or (4) a combination thereof.

16. The non-transitory computer-readable storage medium of claim 15, wherein the entity count is further classified based on vehicle type or pedestrian entity.

17. The non-transitory computer-readable storage medium of claim 15, further comprising instructions to:
obtain temporal context data of the area comprising the intersection.

18. The non-transitory computer-readable storage medium of claim 17, wherein the temporal context data further comprises intersection deadlock scores of neighboring intersections of the intersection.

19. The non-transitory computer-readable storage medium of claim 15, wherein the map feature data of the area further comprises road feature data of a plurality of road segments connected to the intersection; and wherein the map feature data comprises one of a lane count, functional class, traffic light information, speed limit information, or adjacent POI information for each respective road segment.

20. The non-transitory computer-readable storage medium of claim 15, wherein the machine learning model is based on at least one generalized intersection deadlock vector.

* * * * *